United States Patent
Lai et al.

(10) Patent No.: US 11,863,412 B2
(45) Date of Patent: Jan. 2, 2024

(54) PACKET INFORMATION ANALYSIS METHOD AND NETWORK TRAFFIC MONITORING DEVICE

(71) Applicant: Chung Yuan Christian University, Taoyuan (TW)

(72) Inventors: Yu-Kuen Lai, Taoyuan (TW); Cheng-Lin Tsai, Taoyuan (TW); Kai-Po Chang, Taoyuan (TW)

(73) Assignee: Chung Yuan Christian University, Taoyuan (TW)

( * ) Notice: Subject to any disclaimer, the term of this patent is extended or adjusted under 35 U.S.C. 154(b) by 111 days.

(21) Appl. No.: 17/749,177

(22) Filed: May 20, 2022

(65) Prior Publication Data
US 2023/0300046 A1 Sep. 21, 2023

(30) Foreign Application Priority Data

Mar. 16, 2022 (TW) .................................. 111109585

(51) Int. Cl.
*H04L 43/062* (2022.01)
*H04L 43/0811* (2022.01)
*H04L 43/0888* (2022.01)

(52) U.S. Cl.
CPC ........ *H04L 43/062* (2013.01); *H04L 43/0811* (2013.01); *H04L 43/0888* (2013.01)

(58) Field of Classification Search
CPC . H04L 43/062; H04L 43/0811; H04L 43/0888
See application file for complete search history.

(56) References Cited

U.S. PATENT DOCUMENTS

| | | | |
|---|---|---|---|
| 2003/0067878 A1* | 4/2003 | Zboril | H04L 47/10 370/235 |
| 2008/0184367 A1 | 7/2008 | McMillan et al. | |

(Continued)

FOREIGN PATENT DOCUMENTS

| | | |
|---|---|---|
| CN | 101980506 | 2/2011 |
| CN | 104202336 | 12/2014 |

(Continued)

OTHER PUBLICATIONS

Yu-Kuen Lai; et al., "Sketch-based Entropy Estimation for Network Traffic Analysis using Programmable Data Plane ASICs," 2019 ACM/IEEE Symposium on Architectures for Networking and Communications Systems (ANCS), Sep. 2019, pp. 1-2.

(Continued)

*Primary Examiner* — Hitesh Patel
*Assistant Examiner* — Eui H Kim
(74) *Attorney, Agent, or Firm* — JCIPRNET

(57) ABSTRACT

A packet information analysis method and a network traffic monitoring device are disclosed. The method includes the following. Network flow data including a plurality of network packets is obtained. An index parameter is generated according to packet information (e.g., header information) of the first network packet among the network flow. A target mapping model is determined from a plurality of candidate mapping models according to the index parameter. The index parameter is between a first sampling point and a second sampling point of the target mapping model. An interpolation mapping value is obtained according to the index parameter, the first sampling point, the second sampling point, and the target mapping model. An evaluation value is obtained according to the interpolation mapping value. The evaluation value reflects a distribution status of a monitoring item in the network traffic flows.

16 Claims, 5 Drawing Sheets

(56) References Cited

U.S. PATENT DOCUMENTS

2018/0091426 A1* 3/2018 Bao .................... H04L 43/0888
2018/0367555 A9   12/2018 Bailey et al.

FOREIGN PATENT DOCUMENTS

| CN | 106972966 | 7/2017 |
| TW | I437850 | 5/2014 |
| TW | I747742 | 11/2021 |

OTHER PUBLICATIONS

Yu-Kuen Lai; et al., "Hardware-assisted estimation of entropy norm for high-speed network traffic," Electronics Letters, vol. 50, Issue 24, Nov. 2014, pp. 1-2.

Yin Zhang et al., "Spatio-Temporal Compressive Sensing and Internet Traffic Matrices", ACM SIGCOMM Computer Communication Review, vol. 39, Issue 4, Oct. 2009, pp. 267-278.

"Office Action of Taiwan Counterpart Application", dated Aug. 9, 2022, p. 1-p. 7.

* cited by examiner

PACKET INFORMATION ANALYSIS METHOD AND NETWORK TRAFFIC MONITORING DEVICE

CROSS-REFERENCE TO RELATED APPLICATION

This application claims the priority benefit of Taiwanese application no. 111109585, filed on Mar. 16, 2022. The entirety of the above-mentioned patent application is hereby incorporated by reference herein and made a part of this specification.

BACKGROUND

Technical Field

The disclosure relates to a real-time network traffic monitoring technology. Particularly, the disclosure relates to a packet information analysis method and a network traffic monitoring device.

Description of Related Art

With the advancement of information technology, the scale of the Internet has increased rapidly, and issues related to information security of the Internet have also received more and more attention. Further, occurrences of various types of attacks and an increasingly huge amount of attack traffic are seen in the backbone network environment. Such a huge amount of network traffic poses challenges to the existing analysis approaches.

Since data flows in network traffic are similar to the volume of water flowing in a stream, if anomalous traffic cannot be analyzed and identified immediately, the massive amount of network traffic needs to be stored for post-mortem analysis.

Post-mortem analysis is expensive and inefficient. Typically, routine services and system operations have already been incurred when occurrences of anomalous traffic are identified from post-mortem analysis. In addition, decreasing the sampling rate in analyzing a massive volume of data also means more difficult to detect anomalous network behavior.

Depending on different underlying network topologies, each type of network attack may exhibit some unique behaviors that make network traffic present special distribution characteristics. Information entropy reflects the degree of sparsity and density of information distribution. Anomalous traffic can be effectively identified by observing changes in the entropy of a specific packet header information. Therefore, the information entropy can be used in many network anomaly detection systems for anomalous behavior detection.

Currently, computation of information entropy is mostly conducted using sampling and/or post-mortem analysis. Sampling improves measurement performance and reduces resource consumption, but may lose information of critical packets. Post-mortem analysis yields the most precise results, but cannot calculate the information entropy in real time.

Precise computation of the information entropy requires counting the number of respective occurrences of monitoring items in an observation time period. However, under high-speed traffic, monitoring items typically occur by millions, and the precise computation of the information entropy in real-time overloads the memory and computational resources of the current network equipment.

SUMMARY

The disclosure provides a packet information analysis method and a network traffic monitoring device capable of analyzing the distribution status of network traffic with a limited memory space.

An embodiment of the disclosure provides a packet information analysis method adapted for a network traffic monitoring device. The packet information analysis method includes the following steps. The network data (also referred to as network flow data) is obtained. The network flow data includes a plurality of network packets. An index parameter is generated according to the packet information (e.g., the header information) of a first network packet among the plurality of network packets. A target mapping model is determined from a plurality of candidate mapping models according to the index parameter. If the index parameter is located between the first sampling point and the second sampling point of the target mapping model, an interpolation mapping value is obtained according to the index parameter, the first sampling point, the second sampling point, and the target mapping model. An evaluation value is obtained according to the interpolation mapping value. The evaluation values are further processed to reflect the distribution status of monitoring traffic flows.

An embodiment of the disclosure provides a network traffic monitoring device, which includes a network traffic capturing interface, a storage circuit, and a processor. The network traffic capturing interface is configured to obtain network flow data. The network flow data includes a plurality of network packets. The storage circuit is configured to store a plurality of candidate mapping models. The processor is coupled to the network traffic capturing interface and the storage circuit. The processor is configured to: generate an index parameter according to packet information of a first network packet among the plurality of network packets; determine a target mapping model from the plurality of candidate mapping models according to the index parameter, which is between a first sampling point and a second sampling point of the target mapping model; obtain an interpolation mapping value according to the index parameter, the first sampling point, the second sampling point, and the target mapping model; and obtain an evaluation value according to the interpolation mapping value. The evaluation values are further processed to reflect the distribution status of monitoring traffic flows.

Based on the foregoing, after the network flow data is obtained, the index parameter may be generated according to the packet information of the first network packet. The target mapping model may be determined from the plurality of candidate mapping models according to the index parameter, and the index parameter is between the first sampling point and the second sampling point of the target mapping model. The interpolation mapping value may be obtained according to the index parameter, the first sampling point, the second sampling point, and the target mapping model. The evaluation value may be obtained according to the interpolation mapping value. The evaluation values are further processed to reflect the distribution status of the monitoring traffic flows.

Accordingly, compared to the convention where a large memory space is employed to store all possible operation results, in the disclosure, the distribution status of the monitoring item in the network packet can be analyzed in real-time with a limited memory space.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
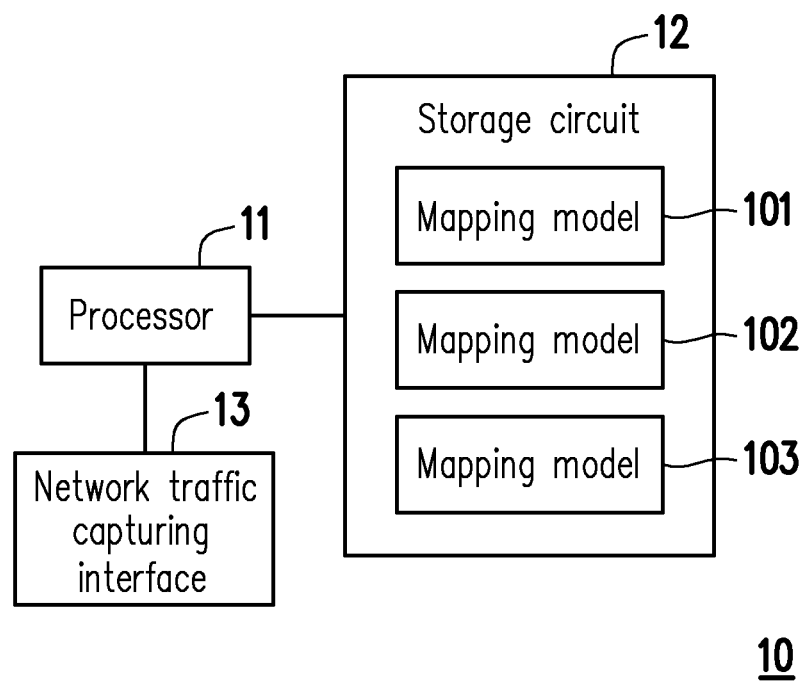
FIG. 1 is a functional block diagram of a network traffic monitoring device according to an embodiment of the disclosure.

Some embodiments of the disclosure accompanied with the drawings will now be described in detail below. For reference numerals are used in the following description, the same reference numerals appearing in different drawings are considered to be the same or similar elements. These embodiments only form part of the disclosure and do not disclose all implementable manners of the disclosure. More specifically, these embodiments are only examples of the method and the device within the scope of the claims of the disclosure.

FIG. 1 is a functional block diagram of a network traffic monitoring device according to an embodiment of the disclosure. With reference to FIG. 1, a network traffic monitoring device 10 may include a processor 11, a storage circuit 12, and a network traffic capturing interface 13. The processor 11 is coupled to the storage circuit 12 and the network traffic capturing interface 13.

The processor 11 is configured to handle all or some operations of the network traffic monitoring device 10. For example, the processor 11 may be a central processing unit (CPU), or any other programmable general-purpose or special-purpose micro control unit (MCU), microprocessor, digital signal processor (DSP), programmable controller, application specific integrated circuit (ASIC), graphics processing unit (GPU), image signal processor (ISP), image processing unit (IPU), arithmetic logic unit (ALU), complex programmable logic device (CPLD), field programmable gate array (FPGA), or other similar elements or a combination of the above elements.

The storage circuit 12 is configured to store data. The storage circuit 12 may be, for example, any type of fixed or removable random access memory (RAM), read-only memory (ROM), flash memory, hard disk drive (HDD), solid state drive (SSD), or similar elements or a combination of the above elements. The storage circuit 12 may also be configured to store programming codes or various applications executable by the processor 11.

The network traffic capturing interface 13 may be configured to obtain network flow data. For example, the network flow data may include network traffic data. For example, the network traffic capturing interface 13 may include a network interface card realized in the hardware form and/or a network traffic capturing program (or network traffic monitoring program) realized in the software form. In addition, the network flow data may include a plurality of network packets.

The storage circuit 12 may be configured to store a plurality of mapping models (also referred to as candidate mapping models) 101 to 103. The mapping models 101 to 103 may be used (e.g., queried) by the processor 11 to obtain a distribution status of at least one monitoring item in the plurality of network packets. For example, the monitoring item may include the header information in link layer, network layer, transport layer and application layer, such as at least one, or a combination, of a source Internet Protocol (IP) address, a destination IP address, a TCP/UDP source port, a TCP/UDP destination port of the plurality of network packets and a protocol number. In addition, the total number of the mapping models 101 to 103 may be more or less, and is not limited by the disclosure.

In an embodiment, the processor 11 may obtain a three-dimensional mapping model. For example, the input of the three-dimensional mapping model may include variables U1 and U2, and the output of the three-dimensional mapping model may include a parameter R(U1, U2). The variables U1 and U2 conform to the uniform distribution. The variables U1 and U2 are both values greater than 0 and less than 1. The parameter R(U1, U2) may be a maximally skewed stable distribution value calculated from the variables U1 and U2. Moreover, the parameter R(U1, U2) may also be referred to as an R function. For example, the parameter R(U1, U2) may be obtained according to formulae (1.1) to (1.3) below.

$$W_1 = \pi\left(U_1 - \frac{1}{2}\right) \quad (1.1)$$

$$W_2 = -\log U_2 \quad (1.2)$$

$$R(U_1, U_2) = \tan(W_1)\left[\frac{\pi}{2} - W_1\right] + \log\left(W_2 \frac{\cos W_1}{\frac{\pi}{2} - W_1}\right) \quad (1.3)$$

In an embodiment, the parameter R(U1, U2) may also be obtained according to formulae (2.1) to (2.3) below.

$$W_1 = \pi U_1 \quad (2.1)$$

$$W_2 = -\log U_2 \quad (2.2)$$

$$R(\text{key}_t) = R(U_1, U_2) = \frac{\sin(\alpha W_1)}{(\sin W_1)^{1/2}}\left(\frac{\sin W_1 \times \Delta}{W_2}\right)^{\Delta/\alpha} \quad (2.3)$$

In formula (2.3), a parameter $R(\text{key}_t)$ may also be used to represent the R function, and $\Delta = 1 - \alpha$.

In an embodiment, the processor 11 may establish the three-dimensional mapping model according to all possible results of the parameters R(U1, U2) computed in advance. After that, during the process of monitoring network traffic, the processor 11 may query the three-dimensional mapping model according to the currently obtained variables U1 and U2 to obtain the corresponding parameter R(U1, U2), to accordingly obtain the distribution status of the monitoring item. However, the data volume of the three-dimensional mapping model is massive. For example, when the decimal precision is 4 digits, the three-dimensional mapping model is stored in a form of 64-bit double-precision floating-point data type. Therefore, the three-dimensional mapping model occupies about 2.5 GB of memory space, which is inefficient in use.

In an embodiment, the processor 11 may generate a two-dimensional mapping model according to the three-dimensional mapping model. For example, the processor 11 may employ the inverse probability integral transform to compress the three-dimensional mapping model into the two-dimensional mapping model. For example, the processor 11 may control the sampling of the three-dimensional mapping model and sort the sampling results through the inverse probability integral transform to accordingly generate the two-dimensional mapping model. Compared to the three-dimensional mapping model, the two-dimensional mapping model has a smaller data volume and occupies less memory space. After that, the processor 11 may generate the mapping models 101 to 103 according to a plurality of sample periods of the two-dimensional mapping model.

In an embodiment, the input of the two-dimensional mapping model may include a variable x, and the output of the two-dimensional mapping model may include a parameter R(x). The variable x is also referred to as a sampling point of the two-dimensional mapping model. Different variables x may form a plurality of sampling points on the two-dimensional mapping model. Each sampling point may be mapped to the corresponding parameter R(x) via the two-dimensional mapping model. The parameter R(x) is also referred to as a mapping value corresponding to the variable x.

Figure 2:
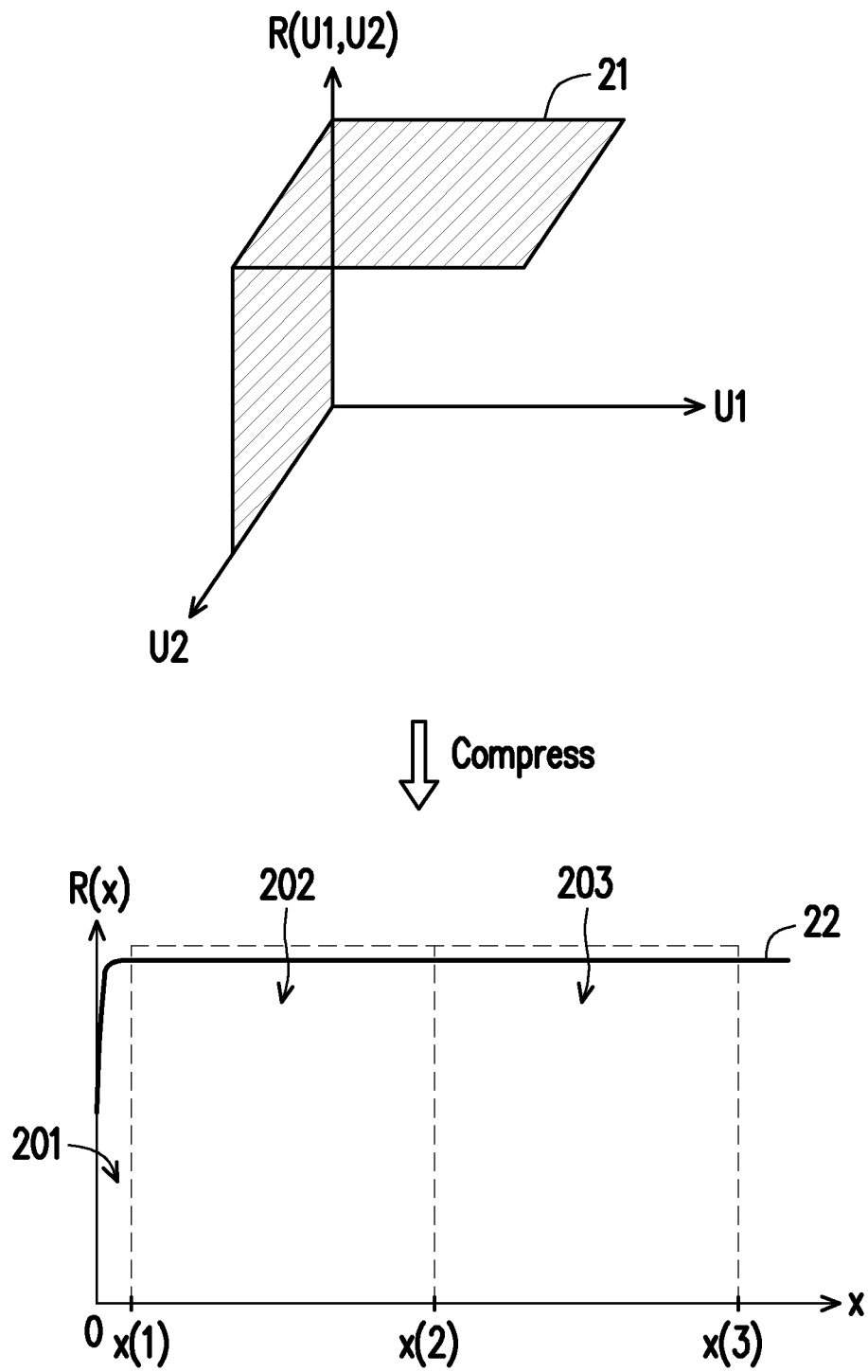
FIG. 2 is a schematic diagram of generating a two-dimensional mapping model according to a three-dimensional mapping model according to an embodiment of the disclosure.

FIG. 2 is a schematic diagram of a two-dimensional mapping model originated from the three-dimensional mapping model according to an embodiment of the disclosure. With reference to FIG. 2, a three-dimensional plane 21 in a three-dimensional space may be used to represent or describe the three-dimensional mapping model. For example, the three axes in the three-dimensional space may respectively correspond to the variables U1, U2 and the parameter R(U1, U2). After the variables U1 and U2 are input to the three-dimensional mapping model, the parameter R(U1, U2) may be obtained according to the output of the three-dimensional mapping model.

In an embodiment, the processor 11 may compress the three-dimensional plane 21 in the three-dimensional space into a two-dimensional curve 22 in the two-dimensional space. For example, according to the inverse probability integral transform, the processor 11 may use a predetermined number of sampling points to sample the three-dimensional plane 21 and sort the sampling results. The sorted sampling results may be used to simulate or approximate the two-dimensional curve 22. The two-dimensional curve 22 may be used to represent or describe the two-dimensional mapping model. For example, the two axes in the two-dimensional space may respectively correspond to the variable x and the parameter R(x). After the variable x is input to the two-dimensional mapping model, the parameter R(x) may be obtained according to the output of the two-dimensional mapping model.

In an embodiment, the processor 11 may divide the two-dimensional curve 22 into sample periods 201 to 203. For example, the sample period 201 covers the sampling range located between the sampling points 0 and x(1) on the two-dimensional curve 22, the sample period 202 covers the sampling range located between the sampling points x(1) and x(2) on the two-dimensional curve 22, and the sample period 203 covers the sampling range located between the sampling points x(2) and x(3) on the two-dimensional curve 22.

In an embodiment, the sample period 201 is also referred to as a span region, the sample period 202 is also referred to as a head region, and/or the sample period 203 is also referred to as a tail region. The processor 11 may generate the mapping models 101 to 103 of FIG. 1 according to the mapping information reflected by the different sections of the two-dimensional curve 22 in the sample period 201 to 203.

Figure 3:
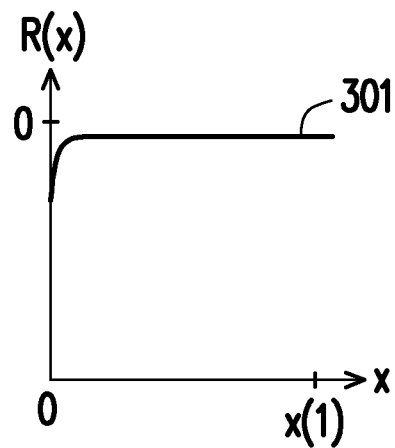
FIG. 3 is a schematic diagram of a two-dimensional curve corresponding to a plurality of candidate mapping models according to an embodiment of the disclosure.
Figure 3:
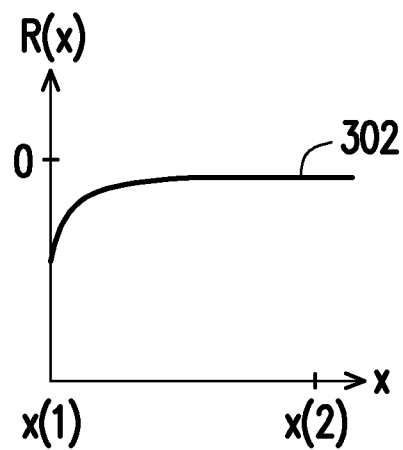
Figure 3:
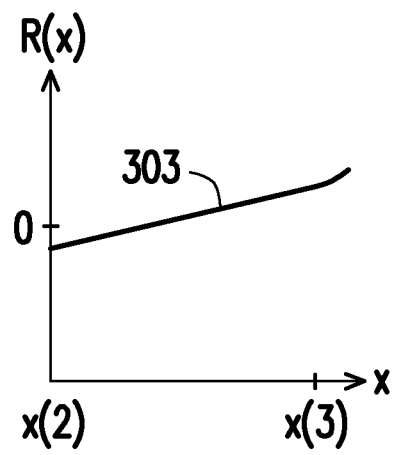

FIG. 3 is a schematic diagram of a two-dimensional curve corresponding to a plurality of candidate mapping models according to an embodiment of the disclosure. With reference to FIG. 2 and FIG. 3, two-dimensional curves 301 to 303 may be used to represent different parts of the two-dimensional curve 22 located in the sample periods 201 to 203.

In an embodiment, the processor 11 may respectively sample the two-dimensional curves 301 to 303 to generate the mapping models 101 to 103 according to at least part of the sampling points (also referred to as candidate sampling points) in the sample periods 201 to 203. The generated mapping models 101 to 103 may respectively be reflected in mapping relations between the plurality of candidate sampling points and a plurality of mapping values (also referred to as candidate mapping values) in the sample periods 201 to 203.

In an embodiment, it is assumed that one of the mapping models 101 to 103 is a first mapping model, and another one of the mapping models 101 to 103 is a second mapping model. The first mapping model may be reflected in a mapping relation (also referred to as a first mapping relation) between a plurality of first candidate sampling points and a plurality of first candidate mapping values in a first sample period. The second mapping model may be reflected in a mapping relation (also referred to as second mapping relation) between a plurality of second candidate sampling points and a plurality of second candidate mapping values in a second sample period.

In an embodiment, the total number of the candidate sampling points in a sample period may be controlled (e.g., reduced) to be less than the total number of predetermined sampling points in the sample period to reduce the data volume corresponding to the generated mapping model. Taking FIG. 2 and FIG. 3 as examples, assuming that the predetermined value of x(1) is 2 to the 10th power (i.e., 1024), it means that the sample period 201 is predetermined to include 1024 sampling points. According to the shape or value distribution of the two-dimensional curve 301, the processor 11 may set the total number of the candidate sampling points in the sample period 201 to 256 (or other numbers less than 1024), and these candidate sampling points are located at critical positions in the two-dimensional curve 301. The processor 11 may sample the two-dimensional curve 301 to obtain 256 (or other numbers less than 1024) candidate mapping values according to the candidate sampling points. The processor 11 may establish the mapping model 101 according to the mapping relation between the 256 candidate sampling points and the candidate mapping values.

Similarly, assuming that the predetermined value of x(2) is 2 to the 15th power (i.e., 32768) and the predetermined value of x(3) is 2 to the 16th power (i.e., 65536), it means that the sample periods 202 and 203 are both predetermined to include more than 30,000 sampling points. According to the shape or value distribution of the two-dimensional curves 302 and 303, the processor 11 may respectively set the total numbers of the candidate sampling points in the sample periods 202 and 203 to 6 and 15, and these candidate sampling points are respectively located at critical positions in the two-dimensional curves 302 and 303. The processor 11 may respectively sample the two-dimensional curves 302 and 303 according to the candidate sampling points to establish the mapping models 102 and 103. By greatly reducing the total number of the sampling points, the data volume in the mapping models 101 to 103 may be correspondingly reduced.

In an embodiment, the processor 11 may generate an index parameter according to packet information of a certain network packet (also referred to as a first network packet) among the plurality of network packets. The packet information may include header information in the network packet. In an embodiment, in response to the monitoring item being the source IP address of the plurality of network packets, the packet information of the first network packet may include information of the source IP address of the first network packet. In an embodiment, in response to the monitoring item being the destination IP address of the plurality of network packets, the packet information of the first network packet may include information of the destination IP address of the first network packet. In an embodiment, in response to the monitoring item being the source port of the plurality of network packets, the packet information of the first network packet may include information of the source port of the first network packet. In an embodiment, in response to the monitoring item being the destination port of the plurality of network packets, the packet information of the first network packet may include information of the destination port of the first network packet.

In an embodiment, the processor 11 may input the packet information (e.g., the source IP address, the destination IP address, the source port, or the destination port) of the first network packet to a random number generator. The random number generator may be configured to generate random numbers. The processor 11 may obtain the index parameter according to the output of the random number generator. The index parameter may include the variable x. For example, the random number generator may perform a hash operation on the packet information of the first network packet, and generate the index parameter according to an operation result of the hash operation. Accordingly, the index parameter exhibits (approximates) the properties of a random number. In addition, in an embodiment, the processor 11 may also generate the index parameter that exhibits (approximates) the properties of a random number by other software/hardware or other algorithms.

According to the index parameter, the processor 11 may select one of the mapping models 101 to 103 and determine the selected mapping model to be a mapping model to be used (also referred to as a target mapping model). In particular, the index parameter may be between two adjacent sampling points (also referred to as a first sampling point and a second sampling point) of the target mapping model. Then, the processor 11 may obtain a reference value (also referred to as an interpolation mapping value) according to the index parameter, the first sampling point, the second sampling point, and the target mapping model.

In an embodiment, the processor 11 may obtain a mapping value (also referred to as a first mapping value) corresponding to the first sampling point and a mapping value (also referred to as a second mapping value) corresponding to the second sampling point according to the target mapping model. Then, the processor 11 may perform an interpolation operation to obtain the interpolation mapping value according to the index parameter, the first sampling point, the second sampling point, the first mapping value, and the second mapping value.

Figure 4:
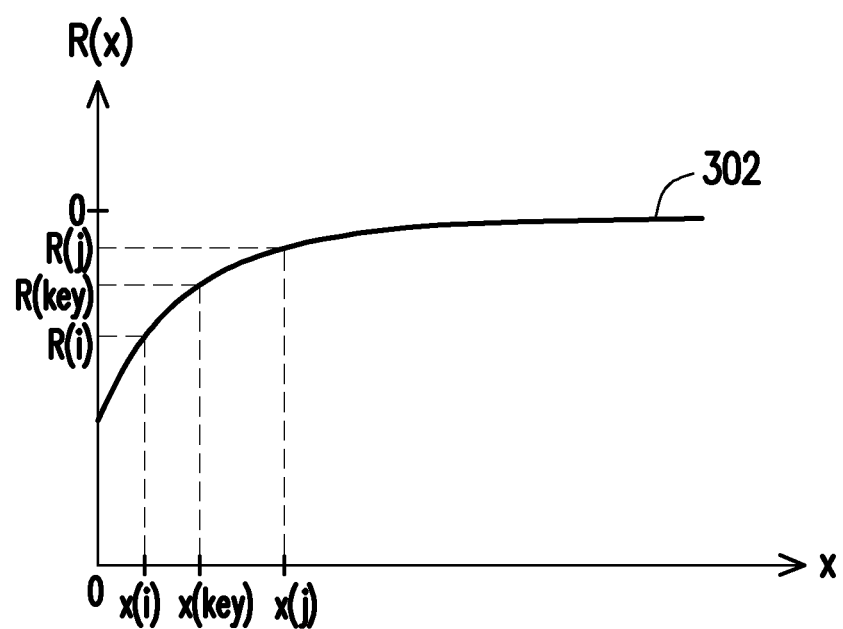
FIG. 4 is a schematic diagram of interpolation operation according to an embodiment of the disclosure.

FIG. 4 is a schematic diagram of interpolation operation according to an embodiment of the disclosure. With reference to FIG. 2 to FIG. 4, it is assumed that the index parameter is x(key) (or x(key$_t$)), and x(key) is in the sampling area 202. In particular, x(key) is between two adjacent sampling points (i.e., candidate sampling points) x(i) and x(j) in the sampling area 202, and the sampling points x(i) and x(j) both belong to the candidate sampling points in the sampling area 202. Therefore, the processor 11 may determine the mapping model 102 corresponding to the two-dimensional curve 302 to be the target mapping model. Then, the processor 11 may obtain a mapping value R(i) corresponding to a sampling point x(i) and a mapping value R(j) corresponding to a sampling point x(j) according to the mapping model 102.

In an embodiment, the processor 11 may perform an interpolation operation to obtain the interpolation mapping value according to formula (3.1) below.

$$R(\text{key}_t) = R(i) + \frac{(R(j) - R(i))}{(x(j) - x(i))} \times (x(j) - x(\text{key}_t)) \quad (3.1)$$

In formula (3.1), the parameter $R(\text{key}_t)$ represents the interpolation mapping value corresponding to an index parameter $x(\text{key}_t)$. The parameter $R(\text{key}_t)$ is between the mapping value R(i) and the mapping value R(j). By performing the interpolation operation, even if the index parameter does not belong to any one of the candidate sampling points, the interpolation mapping value corresponding to the index parameter may still be quickly obtained.

After obtaining interpolation mapping value, the processor 11 may obtain an evaluation value according to the interpolation mapping value. In particular, the evaluation value may reflect the distribution status of the monitoring item in the plurality of network packets. For example, the evaluation value may include an evaluation value of entropy related to the monitoring item in the plurality of network packets. For example, when the monitoring item is the source IP address of the plurality of network packets, the evaluation value may reflect the distribution status of the source IP address of the plurality of network packets, and so on.

In an embodiment, the processor 11 may obtain the evaluation value according to formulae (4.1) to (4.3) below.

$$\hat{H}(\varphi) = -\log[k^{-1}\Sigma_{j=0}^{k-1}\exp(y_j)] \quad (4.1)$$

$$y_j = y_j + R_j(\text{key}_t) \times d_t \quad (4.2)$$

$$y_j = y_j/Y \quad (4.3)$$

In formulae (4.1) to (4.3), a parameter $R_j(\text{key}_t)$ represents an interpolation mapping value calculated corresponding to a network packet received at a time point t, a parameter $\hat{H}(\varphi)$ may be used to represent the evaluation value of entropy related to the plurality of network packets, $d_t=1$ means that a network packet (i.e., the first network packet) is received at the point time t, and Y represents the total number of network packets received within the monitoring time ΔT.

In an embodiment, formula (4.1) above may also be replaced by formulae (5.1) and (5.2) below.

$$\hat{H}(\varphi) = -\log(\hat{f}_\alpha) - \frac{1}{\Delta}\log(Y^\alpha) \quad (5.1)$$

$$\hat{f}_\alpha = \frac{\Delta}{k}\sum_{j=0}^{k-1} y_j^{-\alpha/\Delta} \quad (5.2)$$

In the embodiments above, the entropy of the network packet is estimated using one random number generator with one set of mapping models 101 to 103. However, in an embodiment, the processor 11 may also be provided with multiple random number generators and/or multiple sets of mapping models 101 to 103. In particular, the multiple random number generators may generate different index parameters according to the same seed (e.g., the packet information). The processor 11 may perform the interpolation operation described above to respectively obtain a plurality of interpolation mapping values according to the index parameters output by the multiple random number generators with the multiple sets of mapping models 101 to 103. For example, one set of mapping models 101 to 103 may reflect different sections of one two-dimensional curve, and another one set of mapping models 101 to 103 may reflect different sections of another two-dimensional curve. Then, the processor 11 may estimate the entropy of the network packet according to the interpolation mapping values.

In an embodiment, the processor 11 may obtain the evaluation value according to formulae (6.1) to (6.3) below.

$$\hat{H}(\varphi) = -\log\left[\frac{1}{mp \times kp}\sum_{i=0}^{mp-1}\sum_{j=0}^{kp-1}\exp(Y_{ij})\right] \quad (6.1)$$

$$Y_{ij} = Y_{ij} + R_{ij}(\text{key}_t) \times d_t \quad (6.2)$$

$$Y_{ij} = \frac{Y_{ij}}{pkt_{count}} \quad (6.3)$$

In formulae (6.1) to (6.3), mp represents the total number of provided random number generators, and kp represents the total number of provided sets of mapping models 101 to 103. For example, assuming mp=4 and kp=5, it means that the processor 11 has been provided with four random number generators and five sets of mapping models 101 to 103. In addition, $R_{ij}(\text{key}_t)$ represents the interpolation mapping value calculated according to the index parameter generated by the i-th random number generator with the j-th sets of mapping models 101 to 103, and $pkt_{count}$ represents the total number of network packets received within the monitoring time ΔT.

In an embodiment, formula (6.1) above may also be replaced by formulae (7.1) and (7.2) below.

$$\hat{H}(\varphi) = -\log(\hat{f}_\alpha) - \frac{1}{\Delta}\log(pkt_{count}^\alpha) \quad (7.1)$$

$$\hat{f}_\alpha = \frac{\Delta}{mp \times kp}\sum_{i=0}^{mp-1}\sum_{j=0}^{kp-1}(Y_{ij})^{-\alpha/\Delta} \quad (7.2)$$

The formulae mentioned in the embodiments above are exemplary and are not intended to limit the disclosure. In addition, the formulae mentioned in the embodiments above may be adjusted depending on practical needs, and are not limited by the disclosure.

Figure 5:
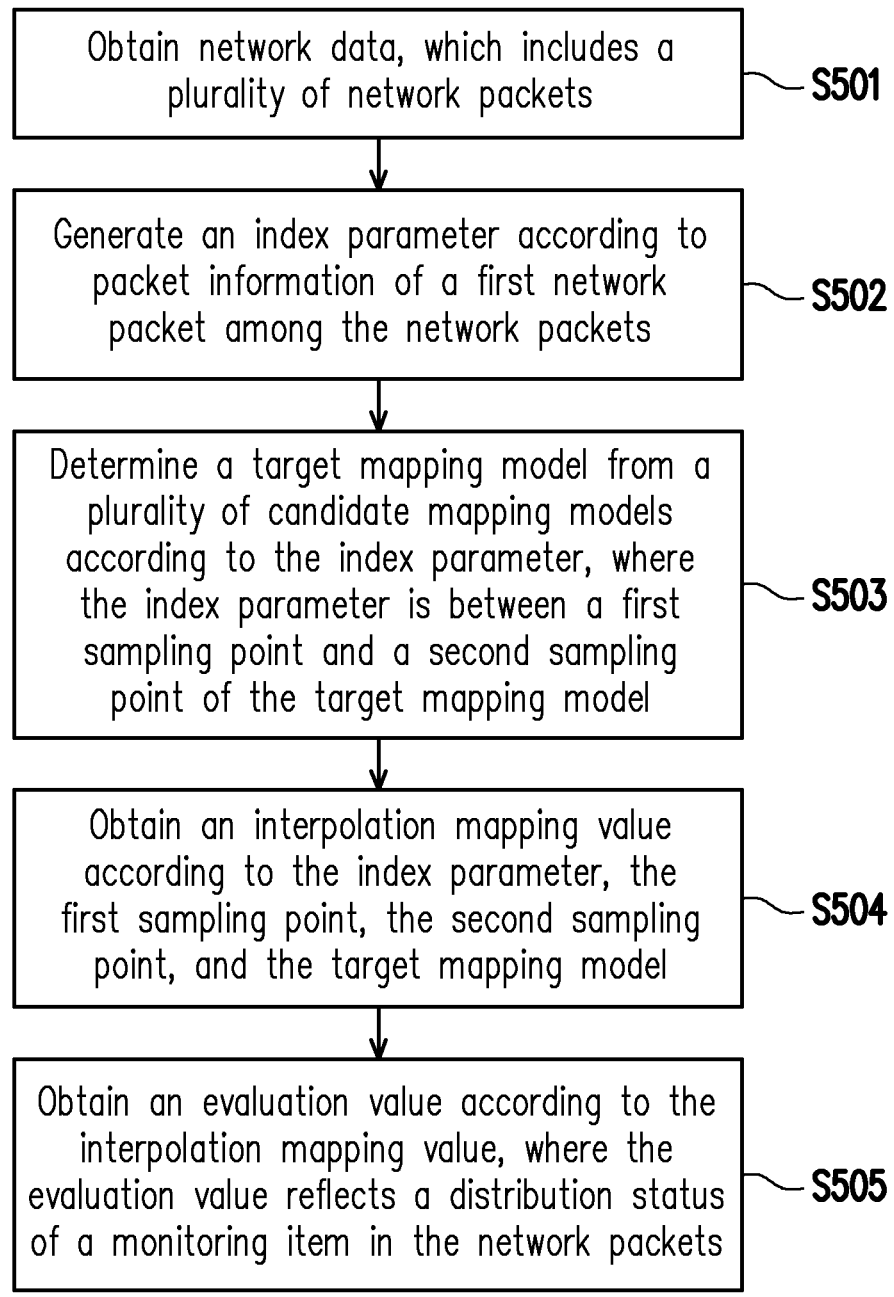
FIG. 5 is a flowchart of a packet information analysis method according to an embodiment of the disclosure.

FIG. 5 is a flowchart of a packet information analysis method according to an embodiment of the disclosure. With reference to FIG. 5, the method of this embodiment is adapted for the network traffic monitoring device 10 as shown in FIG. 1. In step S501, network flow data is obtained, and the network flow data includes a plurality of network packets. In step S502, an index parameter is generated according to packet information of a first network packet among the plurality of network packets. In step S503, a target mapping model is determined from a plurality of candidate mapping models according to the index parameter, and the index parameter is between a first sampling point and a second sampling point of the target mapping model. In step S504, an interpolation mapping value is obtained according to the index parameter, the first sampling point, the second sampling point, and the target mapping model. In step S505, an evaluation value is obtained according to the interpolation mapping value, and the evaluation value reflects a distribution status of a monitoring item in the plurality of network packets.

However, each step in FIG. 5 has been described in detail above, and will not be repeatedly described here. Each step in FIG. 5 may be implemented into a plurality of programming codes or circuits, which is not limited by the disclosure. In addition, the method of FIG. 5 may be used with the exemplary embodiments above, and may also be used alone, which is not limited by the disclosure.

In summary of the foregoing, the packet information analysis method and the network traffic monitoring device provided by the embodiments of the disclosure can be applied to high-speed network traffic analysis and network security monitoring. Moreover, the packet information analysis method and the network traffic monitoring device can quickly estimate the entropy of network traffic, consume limited memory space, and be easily realized in the hardware form.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A packet information analysis method, adapted for a network traffic monitoring device, the packet information analysis method comprising:
   obtaining network flow data, wherein the network flow data comprises a plurality of network packets;
   generating an index parameter according to packet information of a first network packet among the plurality of network packets;
   determining a target mapping model from a plurality of candidate mapping models according to the index parameter, wherein the index parameter is between a first sampling point and a second sampling point of the target mapping model;
   wherein one of the plurality of candidate mapping models is reflected in a mapping relation between a plurality of sampling points and a plurality of mapping values in one of a plurality of sample periods;
   wherein the plurality of candidate mapping models at least comprise:
   a first mapping model, the first mapping model being reflected in a first mapping relation between a plurality of first candidate sampling points and a plurality of first candidate mapping values in a first sample period among the plurality of sample periods; and a second mapping model, the second mapping model being reflected in a second mapping relation between a plurality of second candidate sampling points and a plurality of second candidate mapping values in a second sample period among the plurality of sample periods, wherein the first sample period is different from the second sample period;

obtaining an interpolation mapping value according to the index parameter, the first sampling point, the second sampling point, and the target mapping model; and obtaining an evaluation value according to the interpolation mapping value, wherein the evaluation value reflects a distribution status of a monitoring item in the plurality of network packets.

2. The packet information analysis method according to claim 1, wherein the monitoring item comprises at least one of a source Internet Protocol address, a destination Internet Protocol address, a source port, and a destination port.

3. The packet information analysis method according to claim 1, wherein the packet information of the first network packet comprises at least one of a source Internet Protocol address of the first network packet, a destination Internet Protocol address of the first network packet, a source port of the first network packet, and a destination port of the first network packet.

4. The packet information analysis method according to claim 1, wherein the step of generating the index parameter according to the packet information of the first network packet among the plurality of network packets comprises:

inputting the packet information of the first network packet to a random number generator; and obtaining the index parameter according to an output of the random number generator.

5. The packet information analysis method according to claim 1, wherein the step of obtaining the interpolation mapping value according to the index parameter, the first sampling point, the second sampling point, and the target mapping model comprises:

obtaining a first mapping value corresponding to the first sampling point and a second mapping value corresponding to the second sampling point according to the target mapping model; and performing an interpolation operation to obtain the interpolation mapping value according to the index parameter, the first sampling point, the second sampling point, the first mapping value, and the second mapping value.

6. The packet information analysis method according to claim 5, wherein the interpolation mapping value is between the first mapping value and the second mapping value.

7. The packet information analysis method according to claim 1, further comprising generating a two-dimensional mapping model according to a three-dimensional mapping model; and generating the plurality of candidate mapping models according to a plurality of sample periods of the two-dimensional mapping model.

8. The packet information analysis method according to claim 1, wherein the evaluation value comprises an evaluation value of entropy related to the monitoring item in the plurality of network packets.

9. A network traffic monitoring device, comprising:

a network traffic capturing interface configured to obtain network flow data, wherein the network flow data comprises a plurality of network packets;

a storage circuit configured to store a plurality of candidate mapping models; and a processor coupled to the network traffic capturing interface and the storage circuit, wherein the processor is configured to:

generate an index parameter according to packet information of a first network packet among the plurality of network packets;

determine a target mapping model from the plurality of candidate mapping models according to the index parameter, wherein the index parameter is between a first sampling point and a second sampling point of the target mapping model;

wherein one of the plurality of candidate mapping models is reflected in a mapping relation between a plurality of sampling points and a plurality of mapping values in one of a plurality of sample periods;

wherein the plurality of candidate mapping models at least comprise:

a first mapping model, the first mapping model being reflected in a first mapping relation between a plurality of first candidate sampling points and a plurality of first candidate mapping values in a first sample period among the plurality of sample periods; and a second mapping model, the second mapping model being reflected in a second mapping relation between a plurality of second candidate sampling points and a plurality of second candidate mapping values in a second sample period among the plurality of sample periods, wherein the first sample period is different from the second sample period;

obtain an interpolation mapping value according to the index parameter, the first sampling point, the second sampling point, and the target mapping model; and obtain an evaluation value according to the interpolation mapping value, wherein the evaluation value reflects a distribution status of a monitoring item in the plurality of network packets.

10. The network traffic monitoring device according to claim 9, wherein the monitoring item comprises at least one of a source Internet Protocol address, a destination Internet Protocol address, a source port, and a destination port.

11. The network traffic monitoring device according to claim 9, wherein the packet information of the first network packet comprises at least one of a source Internet Protocol address of the first network packet, a destination Internet Protocol address of the first network packet, a source port of the first network packet, and a destination port of the first network packet.

12. The network traffic monitoring device according to claim 9, wherein the operation of generating the index parameter according to the packet information of the first network packet among the plurality of network packets comprises:

inputting the packet information of the first network packet to a random number generator; and obtaining the index parameter according to an output of the random number generator.

13. The network traffic monitoring device according to claim 9, wherein the operation of obtaining the interpolation mapping value according to the index parameter, the first sampling point, the second sampling point, and the target mapping model comprises:

obtaining a first mapping value corresponding to the first sampling point and a second mapping value corresponding to the second sampling point according to the target mapping model; and performing an interpolation operation to obtain the interpolation mapping value according to the index parameter, the first sampling point, the second sampling point, the first mapping value, and the second mapping value.

14. The network traffic monitoring device according to claim 13, wherein the interpolation mapping value is between the first mapping value and the second mapping value.

15. The network traffic monitoring device according to claim 13, wherein the processor is further configured to:
   generate a two-dimensional mapping model according to a three-dimensional mapping model; and
   generate the plurality of candidate mapping models according to a plurality of sample periods of the two-dimensional mapping model.

16. The network traffic monitoring device according to claim 9, wherein the evaluation value comprises an evaluation value of entropy related to the monitoring item in the plurality of network packets.

* * * * *